United States Patent
Consul et al.

(10) Patent No.: US 10,909,654 B2
(45) Date of Patent: Feb. 2, 2021

(54) MANAGEMENT OF GRAPHICS PROCESSING UNITS IN A CLOUD PLATFORM

(71) Applicant: MICROSOFT TECHNOLOGY LICENSING, LLC, Redmond, WA (US)

(72) Inventors: Ashish Consul, Redmond, WA (US); Huy Hoang, Seattle, WA (US); Bryan W. Tuttle, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/529,355

(22) Filed: Aug. 1, 2019

(65) Prior Publication Data
US 2019/0355087 A1 Nov. 21, 2019

Related U.S. Application Data

(62) Division of application No. 14/053,507, filed on Oct. 14, 2013, now Pat. No. 10,402,930.

(51) Int. Cl.
*A63F 9/24* (2006.01)
*G06T 1/20* (2006.01)
*G09G 5/00* (2006.01)
*A63F 13/355* (2014.01)
*G09G 5/36* (2006.01)

(52) U.S. Cl.
CPC ............. *G06T 1/20* (2013.01); *A63F 13/355* (2014.09); *G09G 5/006* (2013.01); *G09G 5/363* (2013.01); *G09G 2330/12* (2013.01); *G09G 2360/02* (2013.01); *G09G 2360/06* (2013.01); *G09G 2370/022* (2013.01)

(58) Field of Classification Search
CPC .......................... G06T 19/006; G06T 2215/16
See application file for complete search history.

(56) References Cited

U.S. PATENT DOCUMENTS

| 2012/0218278 | A1* | 8/2012 | Marketsmueller | G06F 9/38 345/522 |
| 2012/0220373 | A1* | 8/2012 | Cantor | A63F 13/69 463/40 |
| 2012/0249741 | A1* | 10/2012 | Maciocci | G06F 3/017 348/46 |

* cited by examiner

*Primary Examiner* — David L Lewis
*Assistant Examiner* — Eric M Thomas
(74) *Attorney, Agent, or Firm* — Shook, Hardy & Bacon L.L.P.

(57) ABSTRACT

A graphics rendering system is provided for controlling the rendering of images to manage expected errors. The graphics rendering system receives a specification of a render task to be performed to render an image of a graphics scene and then identifies computing devices that each have a graphics processing unit. The graphics rendering system directs each of the identified computing devices to render the image specified by the render task such that each identified computing device renders the same image. When the graphics rendering system detects that a computing device has completed the render task successfully, it provides the image rendered by that computing device as the rendered image of the render task such that any other image rendered by another of the computing devices is not needed.

20 Claims, 6 Drawing Sheets

MANAGEMENT OF GRAPHICS PROCESSING UNITS IN A CLOUD PLATFORM

CROSS-REFERENCE TO RELATED APPLICATIONS

This application is a divisional application of co-pending U.S. application Ser. No. 14/053,507, filed on Oct. 14, 2013, entitled "Management of Graphics Processing Units in a Cloud Platform," which is incorporated herein by reference in its entirety.

BACKGROUND

In many domains, computer programs are being developed that need rendering of increasingly complex graphics scenes. These domains include games, genetic modeling, cinematic animation, simulations (e.g., flight simulators), and so on. Such complex graphics scenes are typically rendered using a graphics pipeline that generates a 2D image from 3D objects, shading equations, texture maps, tessellation techniques, camera angles, and so on. The computational resources needed to render a complex, pseudo-realistic 2D image in real time using such a pipeline typically exceeds the processing capabilities of the central processing unit ("CPU") of many consumer computers such as desktops, laptops, tablets, smartphones, and so on. To provide the needed computational resources, many consumer computers include a graphics processing unit ("GPU") that provides special-purpose hardware support for rendering images from graphics scenes.

To support the computational demands for rendering of the increasingly complex graphics scenes, GPU architectures are becoming increasingly complex. A typical GPU architecture includes various processing units for performing specific rendering tasks. These processing units may include a vertex shader, a hull shader, a geometry shader, a tessellation unit, a fragment shader, a clipping unit, a rasterizer, and so on. Early GPUs had fixed-function units for performing the various rendering tasks. GPUs now include programmable units for executing programs provided to the GPU as input. For example, a graphics device driver may compile a program written in a shading language to perform a specific type of shading function and provide the compiled program to the GPU by a processing unit. A GPU may also include memory for storing graphics primitives that define the 3D objects, texture maps, binning results, and so on.

GPU architectures are also increasingly complex and costly because they may have many programmable units (e.g., tens of shaders) and use sophisticated multithreading techniques to assign tasks to the programmable units. The hardware and software needed to manage such multithreading is very complex. In addition, the GPU architectures may use several special-purpose memory organizations, such as a binning memory and a hierarchical cache memory, to improve performance.

Because of the complexity of the GPU architectures, the GPUs are susceptible to various types of hardware errors that may prevent the successful rendering of an image. For example, these errors may be caused by a problem with the power supply, a hardware failure in a processing unit, a memory error (e.g., "bit rot"), and so on.

Some GPU architectures employ sophisticated techniques to minimize the effects of a hardware error. For example, a GPU architecture may track which processing units or memory locations have failed and automatically retry the rendering while avoiding the cause of the failure. Such sophisticated techniques further add to the complexity and consequently the cost of a GPU architecture. Because of the increased cost, these sophisticated techniques are only used on high-end GPUs and are not typically used on what are referred to as "commodity" GPUs. The high-end GPUs also have much more computational power than a commodity GPU. In general, a high-end GPU will typically support double precision arithmetic (e.g., 64 bits), whereas a commodity GPU will typically support only single precision arithmetic (e.g., 32 bits). As a result, high-end GPUs can cost orders of magnitude more than commodity GPUs.

SUMMARY

A graphics rendering system is provided for controlling the rendering of images to manage expected errors. In some embodiments, the graphics rendering system receives a specification of a render task to be performed to render an image of a graphics scene and then identifies computing devices that each have a graphics processing unit. The graphics rendering system directs each of the identified computing devices to render the image specified by the render task such that each identified computing device renders the same image. When the graphics rendering system detects that a computing device has completed the render task successfully, it provides the image rendered by that computing device as the rendered image of the render task such that any other image rendered by another of the computing devices is not needed.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

DETAILED DESCRIPTION

Figure 1:
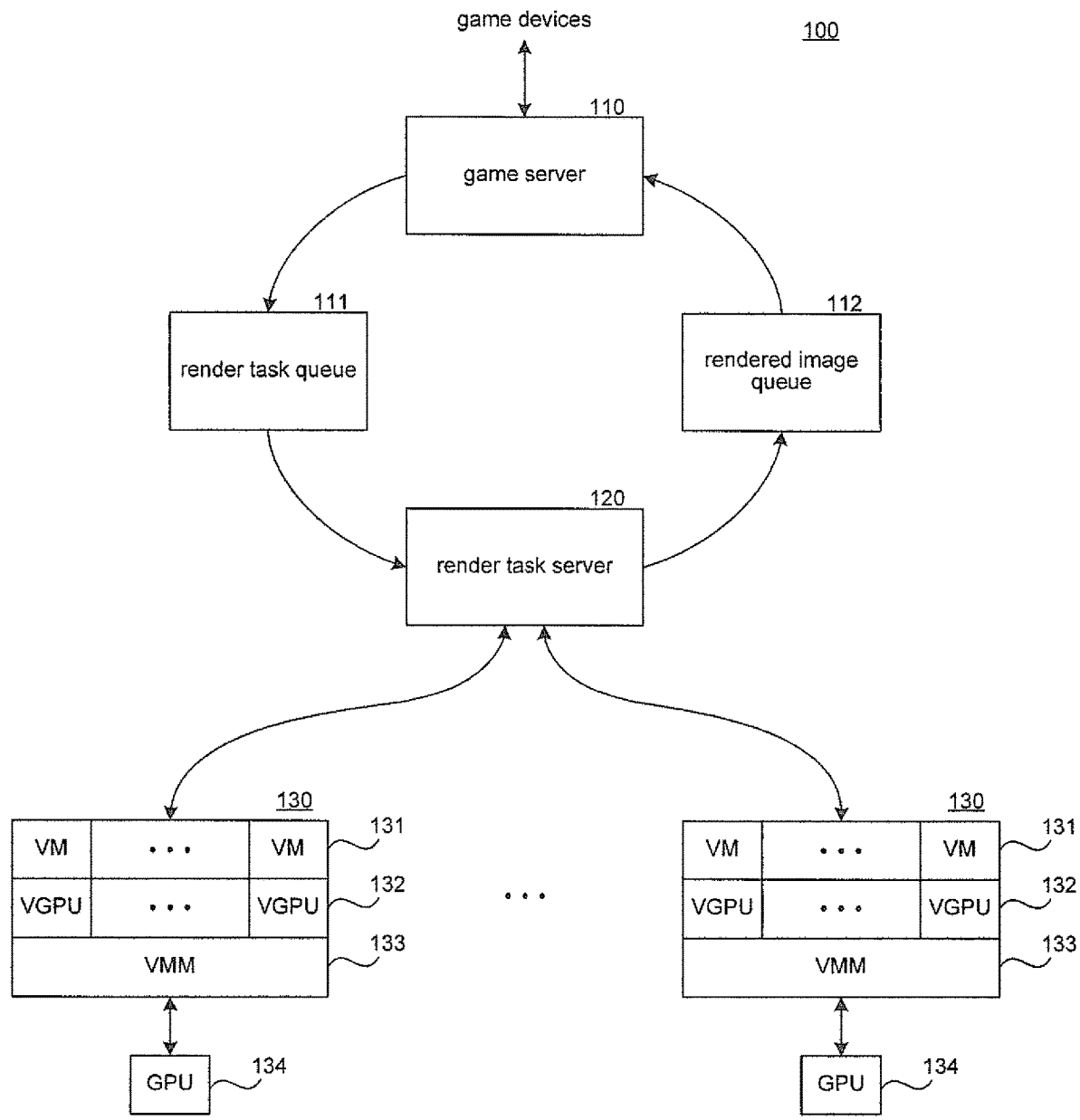
FIG. 1 is a block diagram that illustrates components of a cloud platform hosting a graphics rendering system in some embodiments.

A method and system for controlling the rendering of images using GPUs in a way that manages errors is provided. In some embodiments, a graphics rendering system receives a specification of a render task to be performed to render an image of a graphics scene for a computer program. A graphics scene may be defined by a collection of graphics primitives (e.g., points, lines, and triangles) defining objects (e.g., a car or a face), colors, lighting characteristics, textures, viewing angles, and so on. The graphics rendering system interfaces with computing devices that have commodity GPUs. The computing devices may be servers of a cloud platform that services client devices. Because the computing devices have commodity GPUs, there is a much higher chance of a render task being unsuccessful as a result of hardware failure than if the computing devices had high-end GPUs. Although some level of error correction could be performed by a computing device, such correction may be computationally expensive and would be unlikely to correct many of the errors that could be detected by and corrected by high-end GPUs. (Note: Even a high-end GPU would not be able to detect and correct all errors.) To avoid this computational expense of correcting errors, the graphics rendering system manages rather than corrects these errors. To manage the errors, the graphics rendering system directs multiple computing devices to render the same image in parallel. Because the same image is rendered by different commodity GPUs, there is a high probability that at least one of the GPUs will successfully render the image. The graphics rendering system does not need to wait until each computing device completes its rendering. Rather, the graphics rendering system can, as soon as the first computing device renders the image successfully, use that rendered image as the result of the render task. For example, the graphics rendering system may provide that rendered image to a server-side component of an application program executing within the cloud platform that sends the rendered image to a client-side component executing on a client device (e.g., smartphone) for display. The graphics rendering system can either let the remaining computing devices complete the render task and simply disregard the rendered images as being superfluous or can direct the remaining computing devices to abort their rendering. In addition to increasing the chances of having an image rendered successfully, the graphics rendering system also increases the chances of more quickly completing the rendering because, even though the rendering is delayed at one computing device (e.g., because of network congestion, an overloaded CPU, or a non-GPU hardware or software failure), the rendering by other computing devices may not be delayed.

In some embodiments, the graphics rendering system may interface with a cloud platform that provides servers host virtual machines that each have access to a commodity GPU via a virtual GPU; such servers are referred to as GPU servers. A server of the cloud platform may execute a server-side component of a computer program that generates graphics scenes, submits render tasks to generate images of those graphics scenes, and sends those rendered images to client-side components for display. For example, the computer program may be a game program, and the client-side component may execute on devices of game players. When the computer program is launched on a server, the graphics rendering system may allocate virtual machines hosted by different GPU servers for rendering the images of the computer program. The virtual machines execute code that may be part of the graphics rendering system and that receives render tasks, directs the virtual GPU to perform the render tasks, and provides the rendered image as the result of the render task. The virtual machines may also store the state of the rendering for the computer program to facilitate subsequent performing of subsequent render tasks for the computer program. Because the virtual machines hosted by a GPU server access the commodity GPU through a virtual GPU, the GPU server can interleave access to the commodity GPU by the hosted virtual machines without knowledge by the virtual machines (except possibly from increased rendering time).

In some embodiments, the graphics processing system may support the rendering of an image in multiple resolutions and/or multiple languages. The game players may have different types of devices with different resolutions. For example, one device may have a resolution of 1024×768, and another device may have a resolution of 1920×1080. If an image is generated at one resolution and then transformed to the other resolution, the transformed image may not be as aesthetically pleasing as if it was rendered directly in the other resolution. Also, a graphics scene may have text content, such as an advertisement on a billboard, that is in a primary language. Some of the game players may, however, speak a different language and would prefer to see the text in their language. To facilitate the rendering of an image in multiple resolutions and in different languages, the graphics rendering system allows a render task to specify both multiple resolutions and/or the text content in multiple languages. Upon receiving such a render task, referred to a multi-data render task, the graphics rendering system generates a render task for each of the resolutions or languages or combination of resolution and language and directs multiple virtual machines to perform each separate render task as it would perform a render task that is not a multi-data render task. When the image for each separate render task is rendered successfully, the graphics rendering system notifies the game program for distribution to appropriate target devices. In the case of a multi-resolution render task, if the image for one of the resolutions could not be rendered, the graphics rendering system may then generate an image in that resolution by transforming an image in another resolution.

In some embodiments, the graphics rendering system may use various techniques to speed up the rendering of an image. The graphics rendering system may divide a render task into render subtasks to be performed in parallel and then combine the results of the render subtasks into the rendered image. For example, the graphics rendering system may divide the image to be rendered into tiles (e.g., 16) and generate a render subtask for each tile. When at least one image is rendered for each of the tiles, the graphics rendering system then stitches together or combines the images of the tiles into the rendered image. The graphics rendering system may assign some of the subtasks to different virtual machines hosted by the same GPU server. If none of the virtual machines of the GPU server successfully completes its subtask, the virtual machines hosted by other GPU servers may be successful.

In some embodiments, if a render task could not be completed successfully using virtual machines hosted by a selected set of GPU servers, the graphics rendering system may direct virtual machines hosted by a different set of GPU servers to perform the render task. The graphics rendering system may initially select a small number (e.g., one or two) of virtual machines to perform a render task and, if they are unsuccessful, select a larger number of virtual machines. A render task may not be completed successfully by any of the virtual machines, for various reasons. For example, a power failure within the cloud platform may cause a failure in each of the GPU servers of the selected set. As another example, if the GPU servers of the selected set all have GPUs of the same type (e.g., model number or SKU), the GPUs may all fail for the same hardware or software reason. To avoid having all render tasks fail because they are all performed by the same type of GPU or the same graphics driver, the graphics rendering system may select virtual machines hosted by GPU servers with different types of GPUs to render an image in parallel. In addition, the graphics rendering system may select virtual machines based on the processing powers and error correction capabilities of the GPUs. For example, the graphics rendering system may initially select virtual machines hosted by GPU servers with GPUs having a relatively high probability of an error to perform a render task (i.e., a low-cost GPU). If the rendering is unsuccessful, the graphics rendering system then may select virtual machines hosted by GPU servers with GPUs with a relatively low probability of error. In such a case, the graphics rendering system could rely primarily on low-cost commodity GPUs and only need to use a higher-cost GPU in relatively infrequent circumstances. The graphics rendering system may also direct a render task to be performed in a staggered schedule by the virtual machines rather than in a true parallel manner. In this way, if the virtual machine that is scheduled to start first is successful (which it should be, in general), the unfinished rendering of the other virtual machines can be aborted without having to expend all the computational resources needed to render the same image multiple times to completion.

FIG. 1 is a block diagram that illustrates components of a cloud platform hosting a graphics rendering system in some embodiments. The cloud platform 100 includes a game server 110, a render task server 120, and GPU servers 130. The game server executes an instance of a game program and receives input from devices of game players and sends rendered images to those devices. When the game program requests that an image be rendered, the game server adds a render task to a render task queue 111 and retrieves the rendered image from a rendered image queue 112. When the game program is initially launched, the render task server performing the functions of the graphics rendering system may allocate virtual machines hosted by the GPU servers to that instance of the game program. Each GPU server may host multiple virtual machines 131 that each have a virtual GPU 132 and may include a virtual machine monitor ("VIVIM") 133 for providing the virtual machine environments. Each GPU server includes a GPU 134. The render task server retrieves the render tasks from the render task queue and distributes the render tasks to virtual machines of the GPU servers. When a virtual machine completes the rendering of the task, it provides the rendered image to the render task server, which adds the rendered image to the rendered image queue. In some embodiments, the cloud platform may include multiple game servers and multiple render task manager servers.

The computing devices of the servers and player devices may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that includes computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon it or may be encoded with computer-executable instructions or logic that implements the graphics rendering system. The data transmission media is media for transmitting data using transitory, propagating signals or carrier waves (e.g., electromagnetism) via a wire or wireless connection.

The graphics rendering system may be described in the general context of computer-executable instructions, such as program modules and components, executed by one or more computers, processors, or other devices. Generally, program modules or components include routines, programs, objects, data structures, and so on, that perform particular tasks or implement particular data types. Typically, the functionality of the program modules may be combined or distributed as desired in various embodiments. For example, the game server 110 of FIG. 1 may be located outside of the cloud platform 100. Aspects of the graphics rendering system may be implemented in hardware using, for example, an application-specific integrated circuit ("ASIC").

Figure 2:
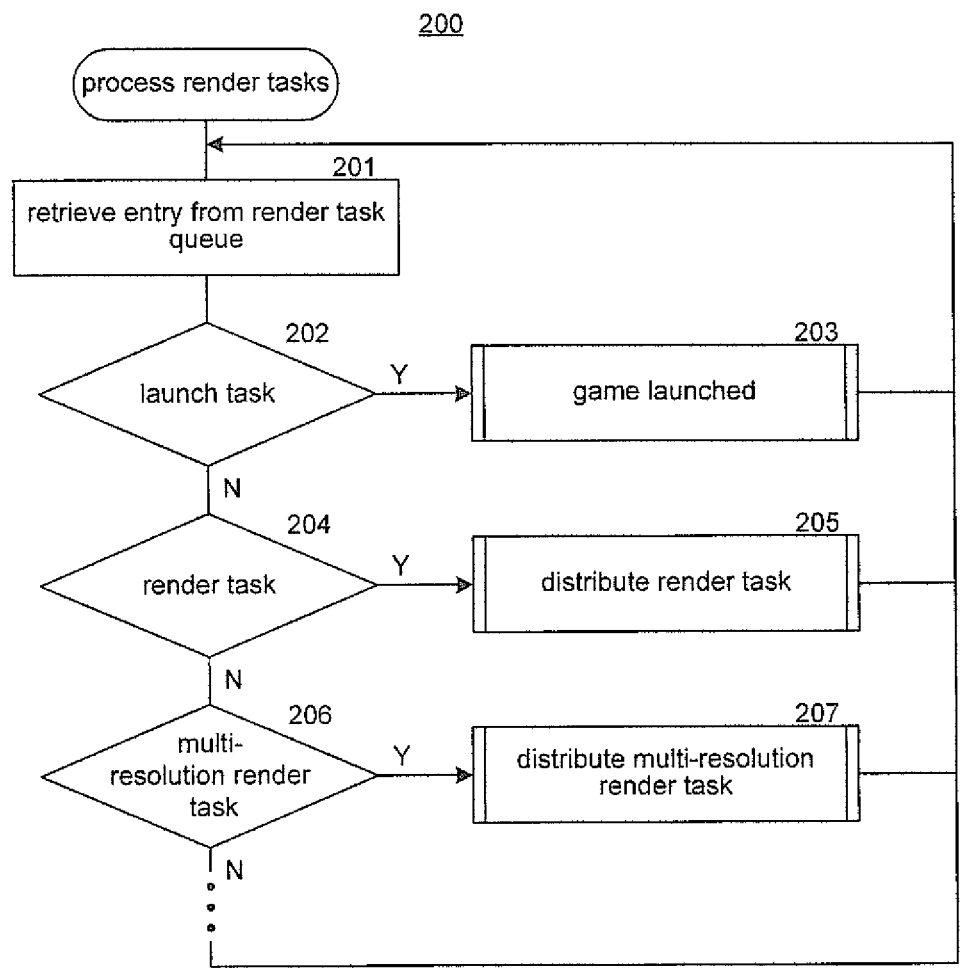
FIG. 2 is a flow diagram that illustrates the processing of a process render task component of a render task server in some embodiments.

FIG. 2 is a flow diagram that illustrates the processing of a process render task component of a render task server in some embodiments. The process render task component 200 monitors the render task queue for render tasks and other notifications received from a game server. The component retrieves an entry from the render task queue, determines the type of the entry, and then invokes a component to process an entry of that type. In block 201, the component retrieves an entry from the render task queue. Although the component is described as a "queue," the render tasks and other notifications sent from the game server to the render task server may be implemented using types of data structures other than a typical first in/first out data structure. For example, the game server may add entries to the data structure along with a priority, and the render task server may process those tasks in priority order regardless of the order in which the entries were added to the data structure. As another example, the render task server may leave entries in the data structure if, for example, resources are not currently available to service those entries. In decision block 202, if the retrieved entry indicates that a game program has been launched, then the component continues at block 203, else the component continues at block 204. In block 203, the component invokes a game launched component to process the launch entry and then loops to block 201 to retrieve the next entry from the render task queue. In decision block 204, if the retrieved entry indicates a render task, then the component continues at block 205, else the component continues at block 206. In block 205, the component invokes the distribute render task component to distribute the render task to the appropriate virtual machines and then loops to block 201 to retrieve the next entry from the render task queue. In decision block 206, if the retrieved entry indicates a multi-resolution render task, then the component continues at block 207, else the component continues to determine the type of the retrieved entry and perform processing appropriate to that entry, as indicated by the ellipsis below block 206. In block 207, the component invokes the distribute multi-resolution render task component and then loops to block 201 to retrieve the next entry from the render task queue.

Figure 3:
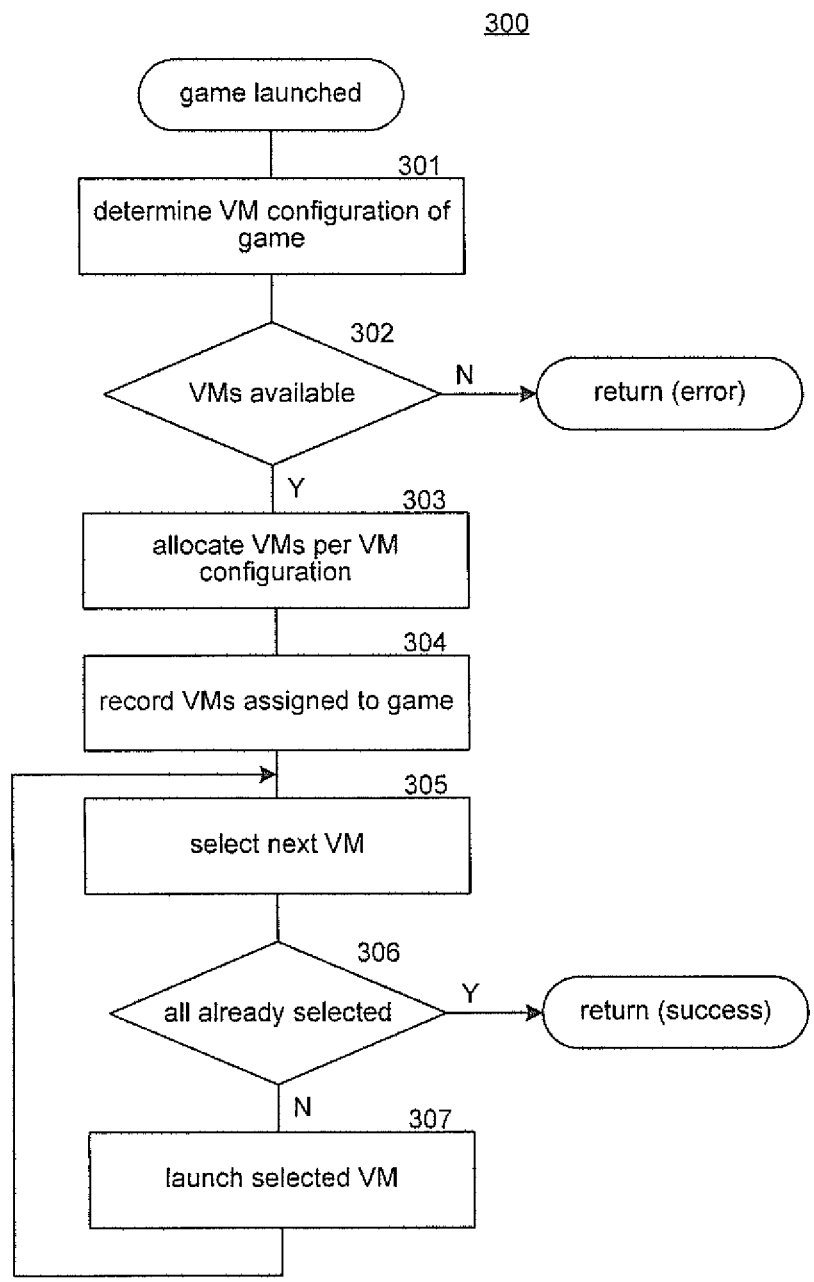
FIG. 3 is a flow diagram that illustrates the processing of a game launched component of the render task server in some embodiments.

FIG. 3 is a flow diagram that illustrates the processing of a game launched component of the render task server in some embodiments. The game launched component 300 is invoked when a new game has been launched and allocates virtual machines to that instance of the game. The number of virtual machines allocated to a game may be based on various criteria such as expected workload of the game program, current workload of the cloud platform, target probability of an error, and so on. The target probability of an error may be used to determine how many virtual machines should be directed to perform the same render task. The number of virtual machines can be derived from the expected probability of an error when rendering an image on a single virtual machine and the target probability. For example, if the expected probability of an error by a virtual machine rendering a task is 0.1 and the target probability is 0.00001, then a render task should be performed by five virtual machines (i.e., 0.1⁵) to have the target probability of at least one of the virtual machines completing the task successfully. In block 301, the component determines the virtual machine configuration for the game. For example, the virtual machine configuration may indicate that a certain number of virtual machines are needed and that no more than two virtual machines should be hosted by the same GPU server. In decision block 302, if sufficient virtual machines are available to satisfy the configuration, then the component continues at block 303, else the component returns an error. In block 303, the component allocates the virtual machines per the virtual machine configuration. In block 304, the component records the virtual machines that are assigned to the game. In blocks 305-307, the component loops launching the virtual machines or preparing already launched virtual machines. In block 305, the component selects the next virtual machine. In decision block 306, if all the virtual machines have already been selected, then the component returns an indication of success, else the component continues at block 307. In block 307, the component launches the selected virtual machine by sending a message to the GPU server that is to host that virtual machine and then loops to block 305 to select the next virtual machine.

Figure 4:
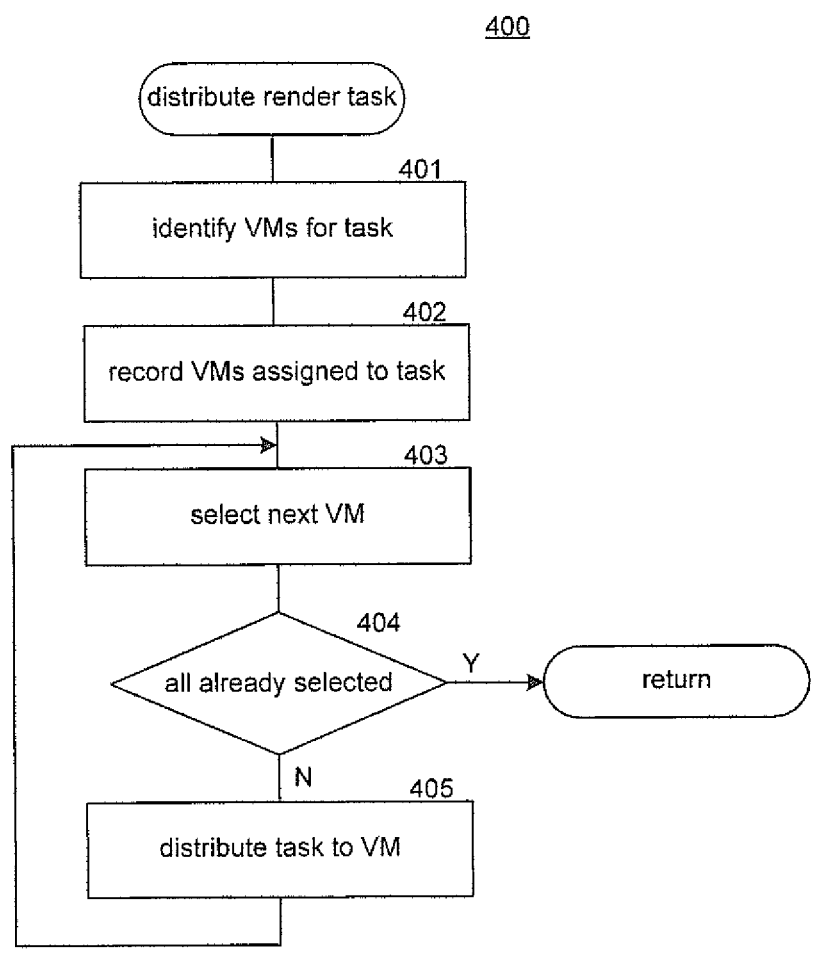
FIG. 4 is a flow diagram that illustrates the processing of a distribute task component of the render task server in some embodiments.

FIG. 4 is a flow diagram that illustrates the processing of a distribute task component of the render task server in some embodiments. The distribute task component 400 is passed an indication of a render task and distributes that render task to virtual machines. In block 401, the component identifies which of the virtual machines allocated to the instance of the game will perform the render task. In block 402, the component records an indication of the virtual machines that are assigned to perform that render task. In blocks 403-405, the component loops distributing the render task to the assigned virtual machines. In block 403, the component selects the next virtual machine assigned to the render task. In decision block 404, if all the virtual machines have already been selected, then the component returns, else the component continues at block 405. In block 405, the component distributes the render task to the selected virtual machine and then loops to block 403 to select the next virtual machine.

Figure 5:
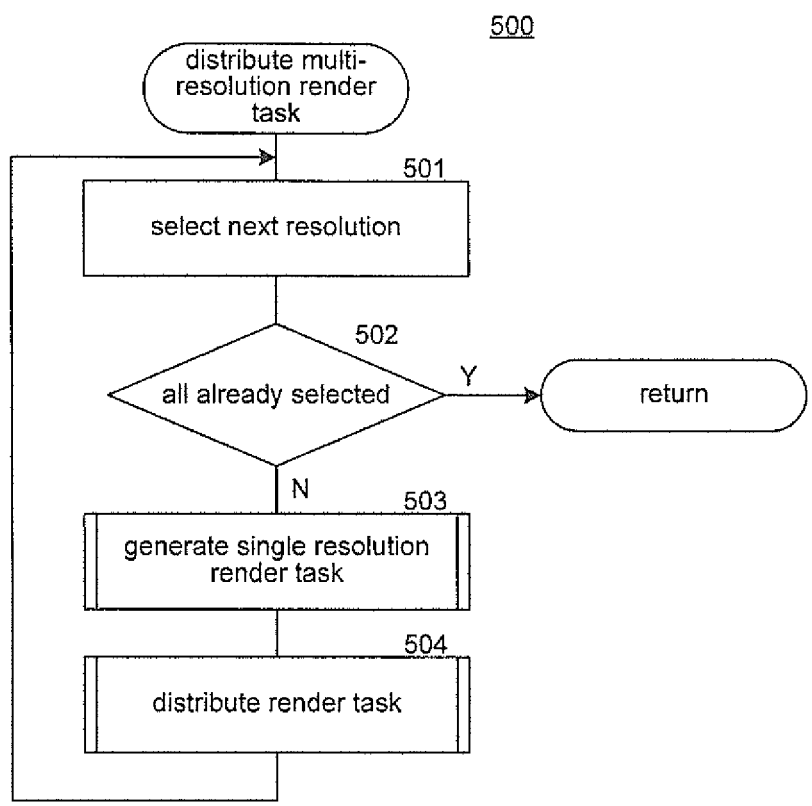
FIG. 5 is a flow diagram that illustrates the processing of a distribute multi-resolution render task component of the render task server in some embodiments.

FIG. 5 is a flow diagram that illustrates the processing of a distribute multi-resolution render task component of the render task server in some embodiments. The distribute multi-resolution render task component 500 is passed an indication of a multi-resolution render task, generates single resolution render tasks, and distributes those single resolution render tasks to the virtual machines. In block 501, the component selects the next resolution of the multi-resolution render task. In decision block 502, if all the resolutions have already been selected, then the component returns, else the component continues at block 503. In block 503, the component generates a single resolution render task for the selected resolution. In block 504, the component invokes the distribute render task component passing an indication of the single resolution render task and then loops to block 501 to select the next resolution.

Figure 6:
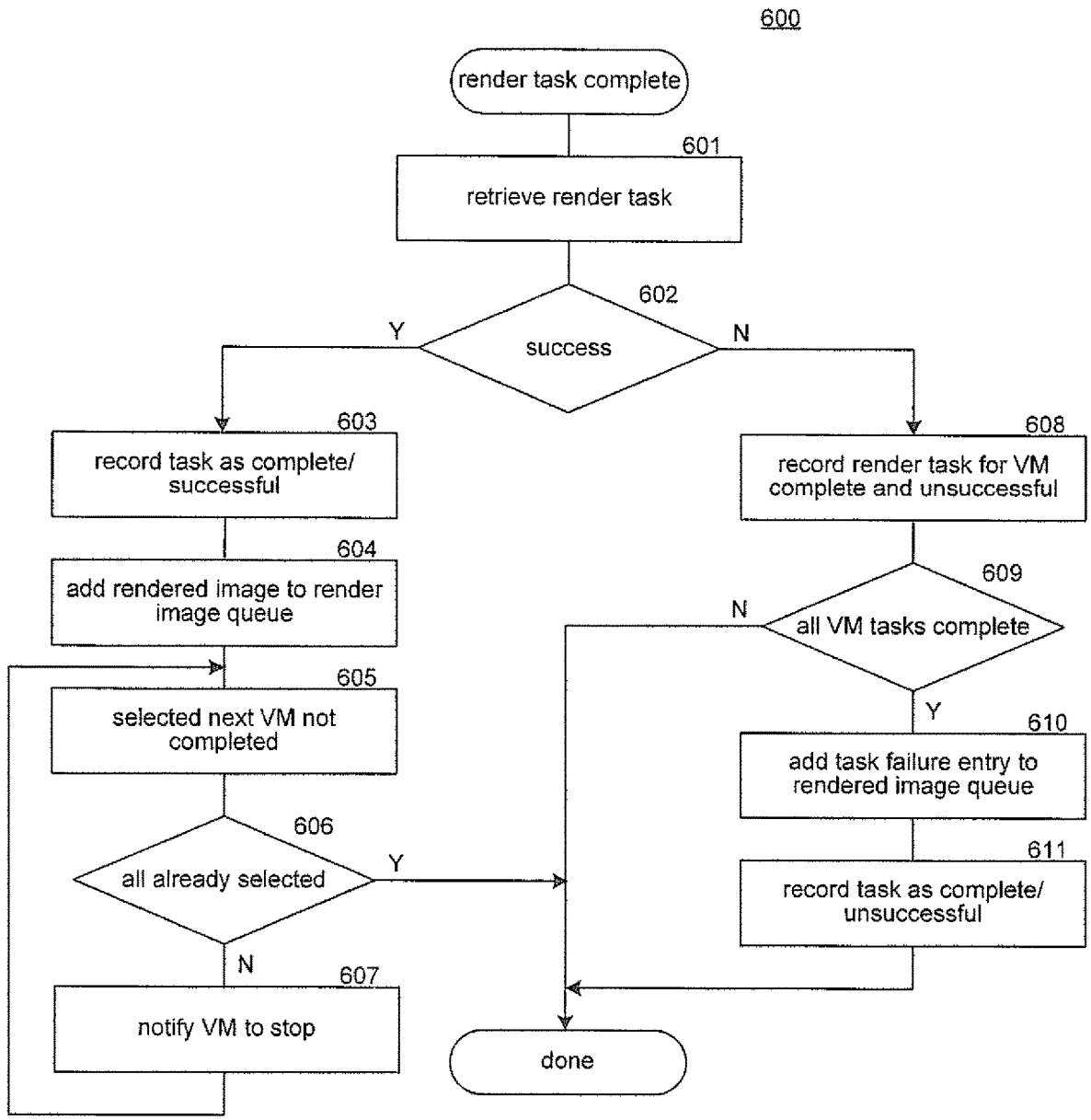
FIG. 6 is a block diagram that illustrates the processing of a render task complete component of the render task server in some embodiments.

FIG. 6 is a block diagram that illustrates the processing of a render task complete component of the render task server in some embodiments. The render task complete component 600 may be invoked when a virtual machine indicates that it has completed processing of a render task. In block 601, the component retrieves an indication of the render task that has been completed. In decision block 602, if the render task was completed successfully, then the component continues at block 603, else the component continues at block 608. In block 603, the component records that the render task has completed successfully. In block 604, the component adds the rendered image to the rendered image queue. In blocks 605-607, the component loops notifying the other virtual machines assigned to perform the same render task to stop the rendering. In block 605, the component selects the next virtual machine that has not completed. In decision block 606, if all such virtual machines have already been selected, then the component completes, else the component continues at block 607. In block 607, the component notifies the selected virtual machine to stop performing that render task and then loops to block 605 to select the next virtual machine. Instead of notifying each remaining virtual machine to stop rendering the image, the component may, upon receiving an indication that a remaining virtual machine has completed rendering its image, simply discard the rendered image. In block 608, the component records an indication that the render task for the virtual machine is complete but unsuccessful. In decision block 609, if all the virtual machines have already completed their render tasks, then the component continues at block 610, else the component completes. In block 610, the component adds a render task failure entry to the rendered image queue. In block 611, the component records the render task as having completed unsuccessfully and then completes. The graphics rendering system may detect that a virtual machine has not been successful in rendering a task in various ways. For example, the graphics rendering system may set a threshold time for completing a render task for a virtual machine. If the graphics rendering system does not receive a notification that the render task has been completed within that threshold time, then it assumes that the virtual machine was not successful. As another example, the graphics rendering system may subscribe to receive notifications of failures of virtual machines from the VMM of a GPU server.

Although the subject matter has been described in language specific to structural features and/or acts, it is to be understood that the subject matter defined in the appended claims is not necessarily limited to the specific features or acts described above. Rather, the specific features and acts described above are disclosed as example forms that implement the claims. For example, the render tasks may be generated by computer programs executing on computers not within the cloud platform and submitted to the cloud platform for rendering. The graphics rendering system may be used to render images of graphics scenes for a variety of applications such as simulations. The graphics rendering system may also be used to take advantage of the capabilities of GPUs other than for rendering images from a graphics scene. For example, some GPUs support the rendering of frames of a video defined in an MPEG format. Also, some computationally intensive applications (e.g., weather forecasting) may use a GPU as an accelerator for performing certain mathematical operations such as complex matrix manipulations. A graphics rendering system, or more generally a GPU task distribution system, may distribute video decoding tasks, mathematical operation tasks, and so on to the virtual machines of the GPU servers. Accordingly, the invention is not limited except as by the appended claims.

What is claimed is:

1. One or more computer-readable storage media storing computer executable instructions for controlling the rendering of images, the computer-executable instructions comprising instructions that:
   receive a render task to be performed to render an image;
   identify a first virtual machine with a graphics processing unit (GPU) as a resource;
   identify a second virtual machine with a different GPU as a resource;
   direct both the first virtual machine and the second virtual machine to simultaneously render the image as specified by the render task; and
   upon detecting an error in rendering the image by the first virtual machine, provide the image as rendered by the second virtual machine.

2. The one or more computer-readable storage media of claim 1, wherein the first GPU and second GPU are commodity GPUs.

3. The one or more computer-readable storage media of claim 1, wherein the render task includes multiple render subtasks for rendering sub-images and wherein the instructions further comprise:
   for each of the render subtasks, identify a virtual machine;
   for each of the render subtasks, direct the identified virtual machine to render the sub-image as specified by the render subtask; and
   combine the rendered sub-images into the image.

4. The one or more computer-readable storage media of claim 1, wherein the first virtual machine and the second virtual machine are different types, the second virtual machine being identified based on a probability of error relative to the first virtual machine.

5. The one or more computer-readable storage media of claim 1, wherein the first virtual machine is directed to render the image in a first resolution and the second virtual machine is directed to render the image in a second resolution.

6. The one or more computer-readable storage media of claim 5, further comprising transforming the image from the second resolution rendered by the second virtual machine to the first resolution based on detecting an error.

7. The one or more computer-readable storage media of claim 1, wherein the error is detected based on a threshold time expiring without detecting that the image was successfully rendered by the first virtual machine.

8. A computing system that controls the rendering of images by graphics processing unit (GPU) servers having GPUs, comprising:
   one or more computer-readable mediums storing computer-executable instructions; and
   a processor for executing the computer-executable instructions that, when executed, cause the processor to:
   receive a render task to be performed to render an image;
   direct each of a first virtual machine and a second virtual machine to render the image as specified by the render task;
   detect an error in rendering the image by the first virtual machine; and
   based on the error in rendering the image by the first virtual machine, provide the image as rendered by the second virtual machine to a computing device for display.

9. The computing system of claim 8, further comprising identifying the first virtual machine and the second virtual machine, wherein the first virtual machine and the second virtual machine are identified based on an expected probability of error for a combination of the first virtual machine and the second virtual machine.

10. The computing system of claim 8, wherein the first virtual machine and the second virtual machine each comprise a different GPU type.

11. The computing system of claim 8, wherein the first virtual machine and the second virtual machine are directed to render the image in parallel.

12. The computing system of claim 8, wherein the first virtual machine and the second virtual machine are directed to render the image using a staggered schedule.

13. The computing system of claim 8, wherein the first virtual machine has a higher probability of error relative to the second virtual machine.

14. A method for rendering of images in a cloud computing platform having graphics processing unit (GPU) servers, the method comprising:
   receiving a render task to be performed to render an image;
   identifying a first virtual machine of a GPU server in the cloud computing platform;
   directing the first virtual machine to render the image as specified by the render task;
   upon detecting an error in rendering the image, identifying a second virtual machine of another GPU server in the cloud computing planform;
   directing the second virtual machine to render the image as specified by the render task; and
   providing the image as rendered by the second virtual machine to a client-side component executing on a client device.

15. The method of claim 14, wherein the GPUs are commodity GPUs.

16. The method of claim 14, wherein the first virtual machine and the second virtual machine are different types, the second virtual machine being identified based on a probability of error relative to the first virtual machine.

17. The method of claim 16, wherein the first virtual machine has a higher probability of error relative to the second virtual machine.

18. The method of claim 14, wherein the first virtual machine is directed to render the image in a first resolution and the second virtual machine is directed to render the image in a second resolution, and wherein the method further comprises:
   transforming the image rendered by the second virtual machine from the second resolution into the first resolution based on detecting the error; and
   providing the image having the first resolution to another client-side component executing on another client device.

19. The method of claim 14, wherein the error is detected based on a threshold time expiring without detecting that the image was successfully rendered by the first virtual machine.

20. The method of claim 14, further comprising determining a number of virtual machines for rendering the image based on a target probability of error.

* * * * *